United States Patent [19]
Forbes

[11] 3,914,534
[45] Oct. 21, 1975

[54] METHODS AND APPARATUS FOR SCRAMBLING AND UNSCRAMBLING PREMIUM TELEVISION CHANNELS

[75] Inventor: F. Douglas Forbes, Palos Verdes Peninsula, Calif.

[73] Assignee: The Magnavox Company, Fort Wayne, Ind.

[22] Filed: Oct. 29, 1973

[21] Appl. No.: 410,677

[52] U.S. Cl. ........... 178/5.1; 178/DIG. 13; 325/308
[51] Int. Cl.$^2$ ........................................ H04N 1/44
[58] Field of Search ....... 178/5.1, DIG. 13; 325/308

[56] References Cited

UNITED STATES PATENTS

| | | | |
|---|---|---|---|
| 3,230,302 | 1/1966 | Bruck et al. | 178/5.1 |
| 3,733,430 | 5/1973 | Thompson et al. | 178/5.1 |
| 3,733,431 | 5/1973 | Kirk, Jr. et al. | 178/5.1 |
| 3,786,424 | 1/1974 | McVoy et al. | 178/DIG. 13 |
| 3,789,131 | 1/1974 | Harney | 178/5.1 |
| 3,790,700 | 2/1974 | Callais et al. | 178/5.1 |

*Primary Examiner*—Richard A. Farley
*Assistant Examiner*—S. C. Buczinski
*Attorney, Agent, or Firm*—Joe E. Barbee; Thomas A. Briody; William J. Streeter

[57] ABSTRACT

A subscriber television system is disclosed having a central unit coupled by way of a plurality of video channels and a plurality of intermediate processors to individual subscriber locations. The central unit includes means for generating a scrambling code and for sequentially transmitting one or more fields of a premium program over different channels in accordance with the code. The code is sent to the intermediate processor, and selectively relayed therefrom, to enable individual subscribers to unscramble the premium program. In one preferred embodiment, each subscriber unit includes a variable frequency oscillator, a mixer, and means for varying the frequency of the variable frequency oscillator in unison with changes in the channel carrying the premium program selected. A band pass filter may be provided to insure that only the desired mixer output channel reaches the subscriber's receiving device.

18 Claims, 6 Drawing Figures

METHODS AND APPARATUS FOR SCRAMBLING AND UNSCRAMBLING PREMIUM TELEVISION CHANNELS

CROSS-REFERENCE TO RELATED APPLICATIONS

Applicant's co-pending application Ser. No. 414,582 filed Nov. 9. 1973 entitled PROGRAM PURCHASE APPARATUS FOR A ONE-WAY CABLE TELEVISION SYSTEM is a related application, the entire subject matter of which is specifically incorporated herein by reference.

BACKGROUND OF THE INVENTION

The present invention relates to premium television systems such as cable, community antenna, closed circuit, over-the-air or other television distribution systems where a charge may be made for at least some of the program services or it is for some other reason desired to deny certain subscribers access to some of the program services. The simplest type of system is, of course, where a fixed, for example, monthly charge is made regardless of the amount of use of the particular programming services utilized, however, it is desirable in many cases to provide certain services or programs cost free and others as premium (fee) programs.

Many systems are known for providing selective billing in television systems and almost invariably such approaches include the inevitable "little black box" associated with the home subscribers receiving unit. Early schemes employed a simple coin deposit box which enabled the receiver for a prescribed time interval, however, more sophisticated systems are known, including schemes where a ticket is deposited and either consumed by or punched and returned by the "little black box" which may also print out an amount due which the subscriber mails along with his check to a central location. These tickets may be ordered by mail, purchased in stores, or conceivably ordered by phone at the last minute. Even more sophisticated systems have made an appearance where a telephone connected to a central location computer is properly dialed to enable the home television set and also supply the computer with information for automatic billing.

All of these systems, of course, encounter attempts by the subscriber to circumvent the system and thus receive his television programs free, and it is accordingly one object of the present invention to prevent unauthorized access to premium television programs.

Another object of the present invention is to provide a method of scrambling premium television signals.

A further object of the present invention is to provide a premium television system having increased security.

A still further object of the present invention is to provide a premium television system which is adaptable to and may develop within existing cable system, at relatively low additional cost.

Yet another object of the present invention is to provide a premium television system in accordance with the previous object and still provide secure scrambling of premium programs.

Still another object of the present invention is to transmit a plurality of television signals over a plurality of channels, and periodically change the channel-program relationship so that a subscriber may receive a continuous television program only when provided with information for determining which channel is carrying a desired television program at a given time.

An additional object of the present invention is to provide a subscriber television system with a simple, yet effective system for billing subscribers according to their actual usage of the system.

BRIEF SUMMARY OF THE INVENTION

The foregoing as well as numerous other objects and advantages of the present invention are achieved by providing, in a subscriber television system, a method and apparatus for scrambling and unscrambling a television program signal, wherein the television program signal is transmitted over a firsts video channel for a first time period and over a second video channel for a second time period and the television receiving device is connected to the first video channel for the first time period and to the second video channel for the second time period. The first and second time periods are integral multiples of the time of duration of one field of the television program signal and synchronizing means are provided to insure that switching from one channel to another occurs only during a vertical retrace interval. A second television program signal in field synchronization with the first is provided and transmitted over that channel which is not carrying the first program signal so as to improve security and make the most efficient use of the existing communication channels. The subscriber television system includes a central unit having the sources of first and second program signals in field synchronization and the system further includes control units or local exchanges remote from the central unit for receiving from the central unit an n-bit binary number indicative of the scrambling sequence. The local exchange supplies decoding information to subscribers and records subscriber usage.

It is accordingly a primary object of the present invention to provide a system for encoding television signals and transmitting those signals along with a key for decoding the signals to a remote local exchange and selectively passing the decoding information along to a subscriber unit and recording the usage by the subscriber of the decoding information.

BRIEF DESCRIPTION OF THE DRAWING

The aforementioned and other objects, features, and advantages of the present invention will become more apparent from the following detailed description thereof when considered in conjunction with the drawing wherein.

DESCRIPTION OF THE PREFERRED EMBODIMENT

Figure 1:
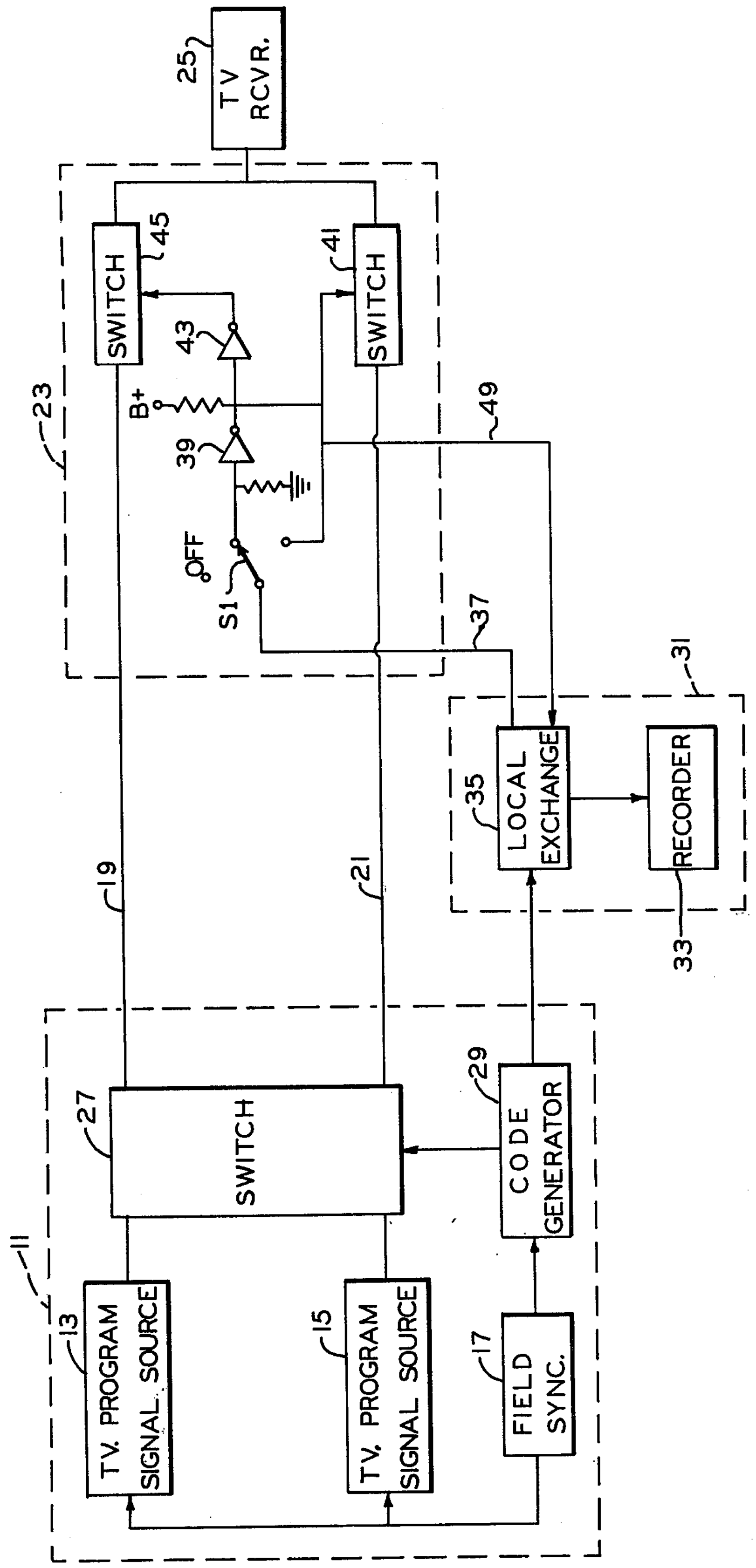
FIG. 1 is a simplified dual feeder encoding-decoding system illustrating some of the principles of the present invention.

Turning first to FIG. 1 the subscriber television system includes a central unit 11 having sources of television program signals 13 and 15 having a source of common field synchronization 17 to insure that vertical retrace occurs at the same time for the television program signals. A plurality of video channels such as 19 and 21 couple the signal sources to a plurality of subscriber control units such as 23 each of which has associated therewith a television receiving device such as 25. The central unit also includes means for selectively connecting one of the television program sources to one channel for a first period of time and to a second channel for a second time period which includes a switching matrix 27 under the control of a code generator 29 which is synchronized with the field synchronizing means 17 so that switching occurs only during vertical retrace periods. Similar means are included within a subscriber control unit to connect the television receiving device to one channel for the first time period and to the other channel for the second time period to thereby provide a preferred television program signal to the receiving device 25 during both time periods. Since switching may occur only during vertical retrace periods the product of either television program field rate ( 60 fields and 30 frames per second in the United States) with either the first or second time period will be an integer. The channels 19 and 21 may be frequency band channels as will appear more clearly subsequently or may be separate feeder line as illustrated in FIG. 1.

The code generator 29 may contain a register having an arbitrary n-bit number stored therein. The binary digits of this number would be repetitively sequentially interrogated or supplied to the switching matrix 27 and that matrix, for example, would connect source 13 to line 19 and source 15 to line 21 if the most recently examined bit were a "zero" and would connect source 13 to line 21 and source 15 to line 19 if the most recently examined bit were a "one." Since the operation of the code generator is synchronized to the field rate of the two television program signals so that switching occurs only during vertical retrace periods, a given number of fields depending on the number of sequential identical bits will be transmitted over a given channel and each time a bit in the sequence is different from its predecessor the channels over which the two signals are transmitted will be reversed. Thus, while the discussion often refers to first and second time periods, it will be clear that additional time periods are also generally involved before the switching sequence repeats.

The n-bit binary number indicative of the scrambling sequence must be made available to the subscriber in some manner in which its use by the subscriber will be reflected in the billing records. As illustrated in FIG. 1, this number is forwarded from the code generator 29 to an interactive data exchange module (IDEM) 31 which contains, for example, a tape recorder 33 for recording billing information as well as local exchange switching circuitry 35 which receives the code from the central unit, forwards individual bits of that code in proper synchronization with the use of the code at the central unit to the subscriber control unit 23 and which receives from the subscriber control unit an indication that the subscriber is using the code bits to unscramble the premium program. This use indication along with an identification of the particular subscriber is recorded on the recorder 33 and, for example, monthly the recorder tape is retrieved by the cable system personnel and taken to a central computer for billing the individual subscribers.

As an example, assume that the number of bits in the unscrambling code is "five" and that it is desired to provide a preview period during which the subscriber is not charged for the program service but after which the charge will be made. For example, a one-half hour program might have the first five or ten minutes thereof provided free to allow the subscriber to determine whether or not he is interested in purchasing that particular program. During this preview period the unscrambling code could be 11111. Prior to the first field scan of the program signal the first binary one would be transferred to the switching matrix 27 to set that matrix so that program signal source 13 was coupled to channel 19 and program signal source 15 coupled to channel 21. The five ones would also be forwarded to the local exchange 35 and the first bit thereof, forwarded to the subscriber control unit over line 37. A one on line 37 will pass through the switch S1 which is illustrated as being in the position to receive program signal source 13. Inversion by amplifier 39 will supply a "zero" to switch 41 putting that switch in the "off" position and further inversion by amplifier 43 will supply a "one" to switch 45 tuning that switch "on" and completing the connection from channel 19 to the television receiver 25. So long as the unscrambling code is not changed the system will continue to cycle through the bits always finding a "one" and always supplying program source 13 over channel 19 through switch 45 to the receiver. Of course, during this preview, if switch S1 is moved to the lower contact, the "one" bit on line 37 will enable switch 41 and block switch 45 thus allowing the television receiver to display the signal on channel 21 from program source 15. After the expiration of the preview period, the unscrambling code is changed, for example, to 11001 and this new code is forwarded to the local exchanges. The first bit in the new code sets the switching matrix 27 to transmit source 13 over channel 19 and source 15 over channel 21 and likewise the first bit is examined by the local exchange and the "one" transmitted over line 37 to the subscriber control unit enabling switch 45 and disabling switch 41. Thus, for the first and second fields after the preview period, program 13 is still supplied by way of channel 19 and switch 45 to the receiver 25 for the third field, however, the code generator 29 supplies a "zero" to the switching matrix 27 causing program source 13 to be transmitted over channel 21 and program source 15 to be transmitted over channel 19. Also, prior to the third field after the preview period, the local exchange 35 supplies a "zero" on line 37 to enable switch 41 while disabling switch 45 and thus this third field is transmitted from program source 13 over channel 21 by way of enabled switch 41 to the receiver 25. The particular unscrambling code may be repetitively used throughout the remainder of the program of this code may be periodically changed and forwarded to the local exchanges to make unauthorized unscrambling even more difficult.

As illustrated in FIG. 1, the local exchange also receives a signal back from the subscriber control unit indicating use by that subscriber of the unscrambling code. In a typical installation, a local exchange unit or IDEM such as 31 will service a small number, for example, 32 subscribers and must have some way of determining which usage response corresponds to which subscriber. This may be accomplished by a frequency multiplexing scheme employing appropriate filters or each subscriber may be assigned a time slot and thus the time of occurrence of the answerback will serve to identify the particular subscriber. The local exchange unit 35 records the subscriber usage along with some subscriber identifying code such, for example, as a five bit number if 32 subscribers are serviced by one local unit. Since there is two-way communication only between the subscribers and the local exchange unit, bilateral amplifiers and other costly items are largely eliminated. It would be noted that the subscriber usage signals as illustrated in FIG. 1 is simply the return of the inverse of the signal supplied on line 37 and if a subscriber were to successfully sever the line 49 he would not be billed for his usage of the unscrambling code.

Figure 2:
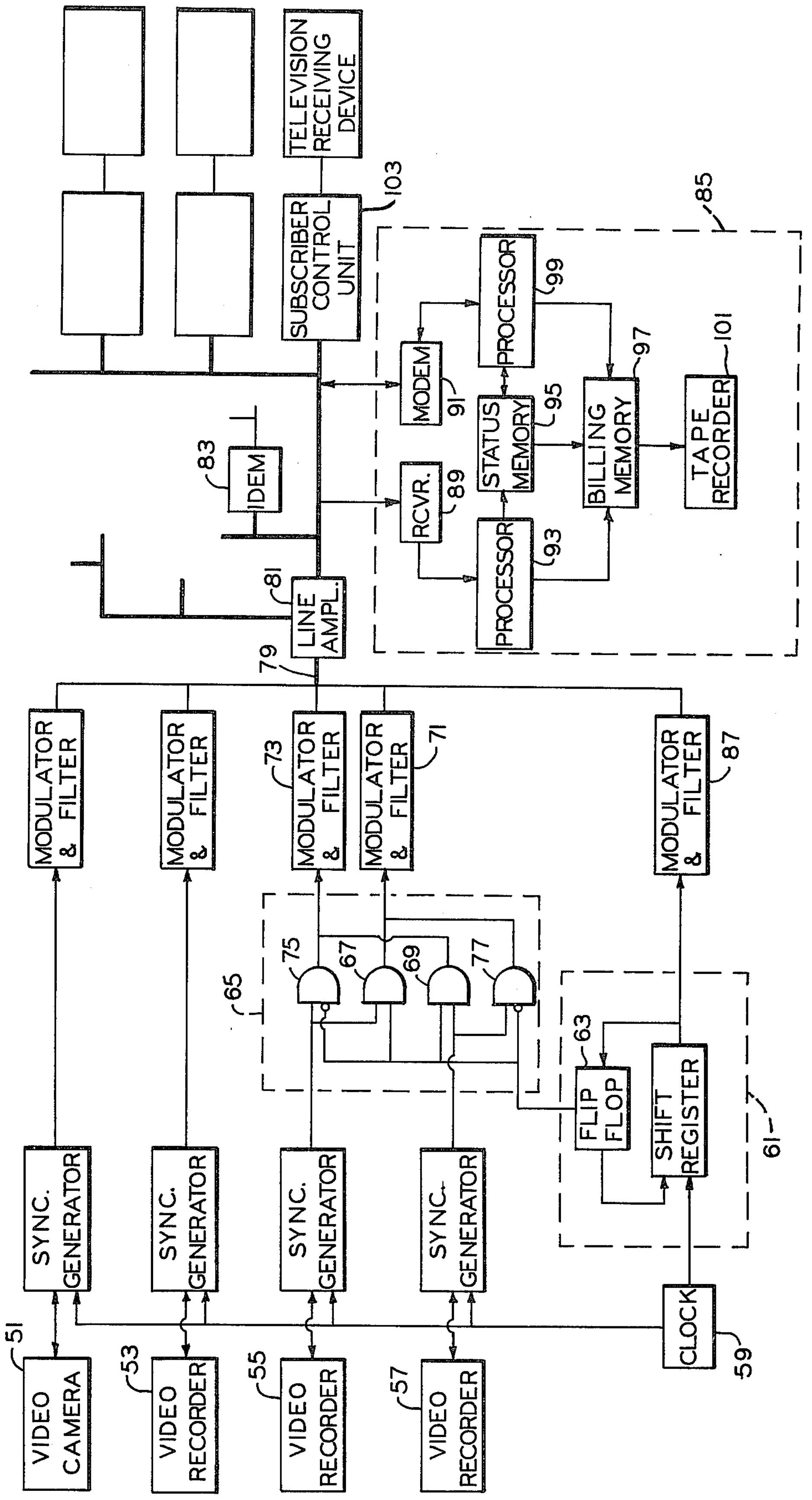
FIG. 2 is a block diagram of a more sophisticated system showing the central unit and local exchange (interactive data exchange module or "IDEM") in detail.

Turning now to FIG. 2, a variety of sources of television program signals such as a local video camera 51 and three video recorders 53, 55 and 57 are illustrated and in the embodiment illustrated in FIG. 2 only the programs from video recorders 55 and 57 are premium programs with the subscribers being allowed free access to the local program video camera 51 and the remaining program from video recorder 53. As illustrated, all four television program sources are field synchronized by the common clock source 59, however, it will be recognized that only the premium program sources require this field synchronization. A clock pulse occurs at the start of each vertical retrace period and may be used to synchronize the several video signal sources so that their respective vertical retrace periods occur simultaneously and also to shift the unscrambling code contained in the code generator 61 by one digital position or stage each frame. The code generator 61 is here illustrated as a simple recirculating shift register having one stage of flip-flop 63 shown separately to illustrate the fact that the status of the flip-flop 63 controls the switching matrix 65. For example, if the bit contained in flip-flop 63 is a "one," one input of each of the AND gates 67 and 69 will be enabled so that gate 67 will pass the signal from the video recorder 55 to the modulator and filter 71 while gate 69 will be enabled to pass the signal from video recorder 57 to modulator and filter 73. Of course, a "zero" in shift register stage 63 will enable gates 75 and 77 by way of their inverter inputs so that, for example, the video recorder 55 will feed through gate 75 to modulator and filter 73.

In the example of FIG. 1, it was implicit that the frequency, for example, of the program source 13 was the same regardless of whether that signal was being carried by line 19 or line 21 and that the receiver 25 of FIG. 1 was responsive to that signal regardless of the line on which it was conveyed. In the FIG. 2 embodiment, however, the field synchronized premium television sources are supplied to modulators and filters 71 and 73 which are of different frequencies so that, for example, the output signal from the modulator 71 will correspond to television channel 5, whereas the output of modulator 73 might correspond to television channel 6. The several other modulators are again of different carrier frequencies so that all of these signals may be carried on a cable 79 and broad band line amplifiers such as 81 to be distributed to a plurality of remote units of IDEMs such as 83 and 85 for ultimate distribution to a plurality of subscriber locations. The unscrambling code contained in the code generator 61 is similarly distributed to the IDEMs, for example, by the carrier frequency of the modulator and filter 87 which is at a frequency not normally accessible to the individual subscribers. This frequency could, for example, be filtered out at the IDEMs prior to a subscribers drop line.

Within the IDEM is a receiving unit 89 tuned to receive, for example, frequency shift keyed digital data modulated at the frequency of the modulator 87 which, in one preferred embodiment, was a 1.5 megacycle band within the 108 megacycle to 120 megacycle range. In addition to the unscrambling code this receiver may receive from the head end other timing and start of message signals. The IDEM also includes a modulator-demodulator 91 which employs duplex time division multiplexing principles to converse in an ordered sequence with each subscriber terminal within its domain. Communications between the IDEM and subscribers are simultaneously bi-lateral data streams with the outgoing data messages from the IDEM including unscrambling information, interrogations, or premium television status commands. Data from the subscriber to the IDEM may, of course, indicate subscriber usage as well as any other desired data. Each subscriber has an assigned time slot as his "address" which is clock derived in a repetitive cycle where the IDEM and each subscriber count from a common clock reference message bit rate which is reset at the start of each subscriber cycle. This cycle is, of course, synchronized to the field rate of the premium video signals thus allowing a portion of the data to be switching information allowing for the unscrambling of the premium video signals. As noted before, the unscrambling bit will be transmitted during a vertical retrace interval. Duplex communication between the IDEM and subscriber control unit is achieved by separate frequency spectra wherein communications from the IDEM is a frequency shift keyed FM data signal and the response is phase shift keyed modulation at a different frequency.

The IDEMs include sequential processors having a processor 93 which accepts digital data from the receiver 89 and compares an address code with a stored IDEM address, processing those commands received after coincidence. The commands may include "preview enable" "preview inhibit" and "end of program" as well as a "program number" command which instructs the billing memory 97 to record the address of all subscribers viewing a premium program at that instant of time. The commands are transferred to and stored in the status memory 95 which also stores the instantaneous status of each of the subscribers and acts as a scratch pad memory to allow economical formatting of the billing information and minimizing the size requirements of the main memory unit. The IDEM-subscriber processor 99, which is shared by a number of subscribers, generates the commands to be transmitted to the subscribers upon receiving a video retrace signal from the processor 93 and then proceeds to clock command messages containing the appropriate unscrambling and enabling codes to its several subscribers sequentially. Upon receiving these downstream commands the subscriber control units transmit a confirmation code or service request back to the processor 99 which response is stored in the status memory 95 for processing. The processor 99 stores a response from the first terminal, checks for service requests in the status memory, processes the command and formats a response message which is loaded into the status memory for subsequent transmission. After completing the processing for the first subscriber control unit, the processor repeats this procedure for each remaining terminal in sequence and after all terminals have been serviced the processor waits for the next video synchronizing signal from processor 93 and the cycle is repeated. As noted earlier, the billing information is ultimately recorded on a, for example, cassette type tape recorder 101 and periodically the cassettes are removed and taken to a central location for billing. Since the communications channels illustrated in FIG. 2 are different frequency bands, a somewhat more complex subscriber control unit than the one illustrated as 23 in FIG. 1 is required and several such units are illustrated in FIGS. 3 through 6.

Figure 3:
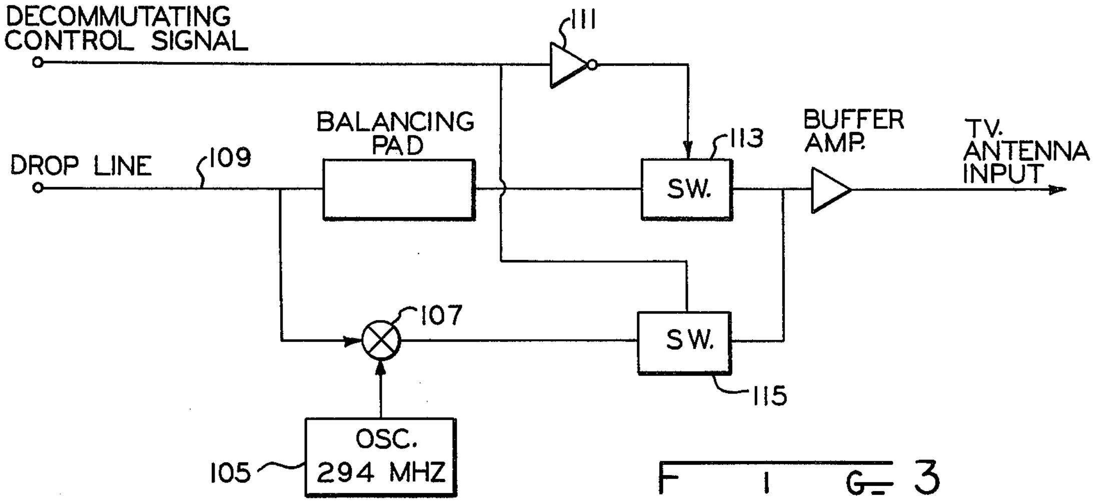
FIG. 3 is a schematic representation of one possible implementation of the subscriber control unit of FIG. 2.

FIG. 3 illustrates a simple analog of the decoder of FIG. 1 which will frequency demultiplex a pair of television signals and is thus usable in the system of FIG. 2. A local oscillator 105 supplies a 294 megacycle signal to a mixer 107 where the incoming frequency encoded television signals on line 109 are selectively mixed with the local oscillator signal and passed to the television receiver. As noted earlier, a control signal comprising a single bit may precede each field of the television signal and is supplied by way of inverter 111 to the switch 113 and directly to the switch 115. If the decoding bit is a "one" switch 115 is enabled to supply the mixer output to the television receiver, whereas if the decoding bit is a "zero" switch 113 is enabled to supply the incoming television signal directly to the receiver. The output signal taken from the mixer 107 is the difference between the 294 megacycle signal from the oscillator 105 and the signal incoming on line 109. Assume, for example, that the desired program is transmitted in the 120 to 126 megacycle range on one channel, and in the 168 to 174 megacycle range on the other channel. Under these circumstances passing the, for example, 120 to 126 megacycle channel signals through the mixer 107 will result in signals in the 174 to 168 megacycle range or, in other words, the result from the mixer experiences a sort of inversion which, unless compensated for, will not yield a continuous viewable picture. It would, of course, be possible to, for example, effect a similar mixing and inversion in the appropriate modulator and filter at the head end or to effect this appropriate inversion at other points within the system, however, a system such as the decoding unit illustrated in FIG. 4 avoids this inversion problem.

Figure 4:
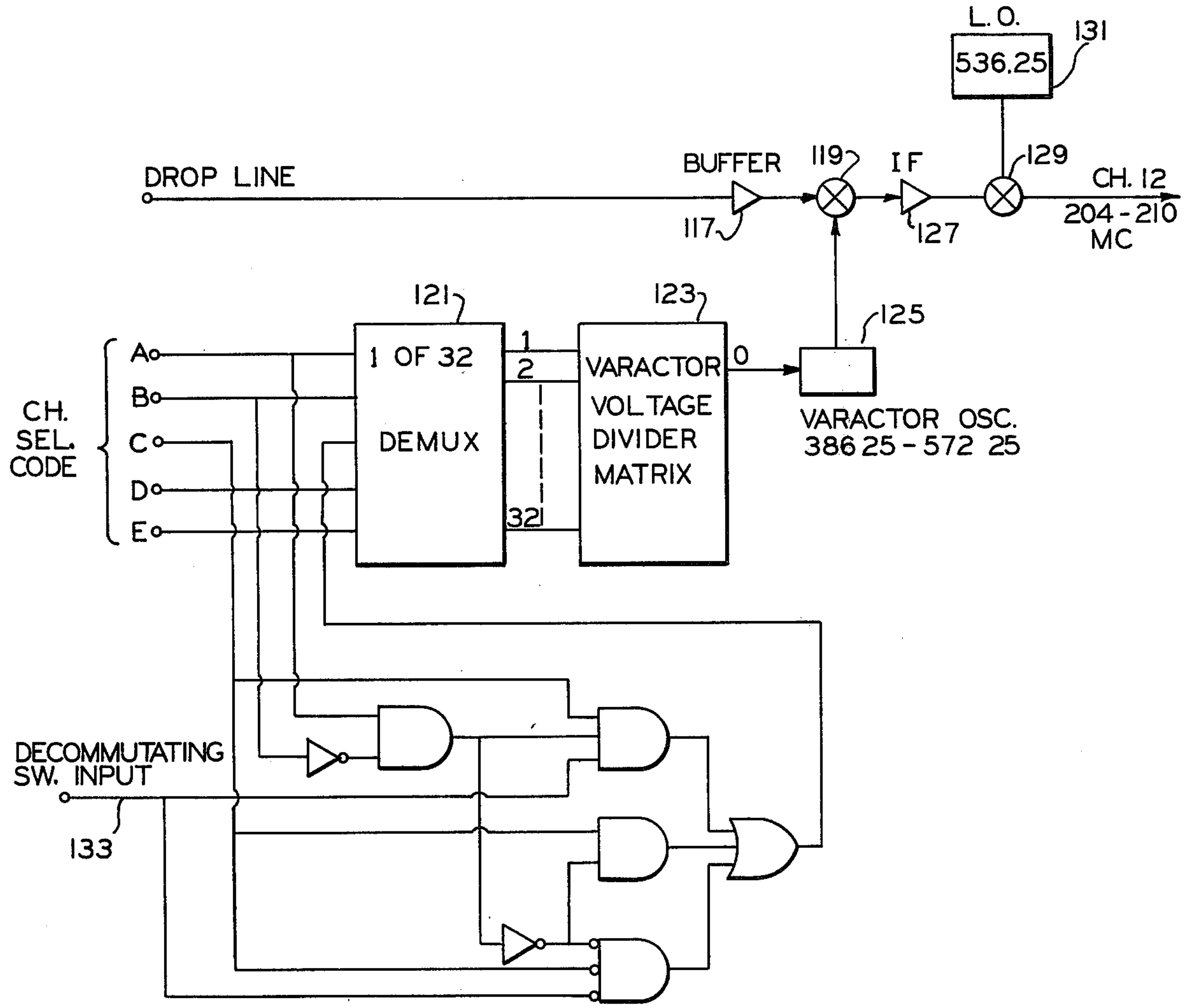
FIG. 4 is another possible implementation of the subscriber control unit of FIG. 2 illustrated in schematic form.

In the premium unscrambling unit illustrated in FIG. 4, incoming video signals pass through a buffer amplifier 117 and then into a mixer 119 regardless of which channel is carrying a desired program at that particular time. A binary channel selecting code of 5 bits is supplied to a demultiplexing matrix 121 which may, for example, be a diode matrix to supply an output on the appropriate one of 32 output lines. This output is then fed through a voltage divider matrix to supply a desired voltage indicative of the particular 5-bit input code to a voltage variable oscillator 125. Thus, the output of the oscillator 125 has a frequency determined by the particular 5-bit channel selecting code input. The mixer output may be passed through an intermediate frequency amplifier 127 and experience a second conversion in the mixer 129 which provides as an output a signal which is the difference frequency between the intermediate frequency from the amplifier 127 and the output of another local oscillator 131. For a given 5-bit code alternate ones of two of the 32 outputs of the demultiplexer 121 are energized in accordance with a series of incoming bits on line 133. The logic circuitry coupling the C bit and the decommutating switch input signal on line 133 to the demultiplexer 121 functions for a non-premium channel viewing situation to route the C input directly to the demultiplexer 121 and to provide a fixed output voltage therefrom to the voltage divider matrix 123 and thus maintain the local oscillator 125 at a fixed frequency. For premium viewing situations this frequency, of course, varies in accordance with the encoding scheme. The variations may be prevented by grounding the line 133 and such selective grounding may, for example, be accomplished by a subscriber premium television switch or key lock switch which prevents the coding unless the subscriber indicates his desire for a premium program. A key lock arrangement could also be provided for only certain premium channels, thus allowing the selective viewing of, for example, X-rated movies. Such key lock and subscriber actuated request schemes will be more clearly understood in reference to the circuit of FIG. 5.

Figure 5:
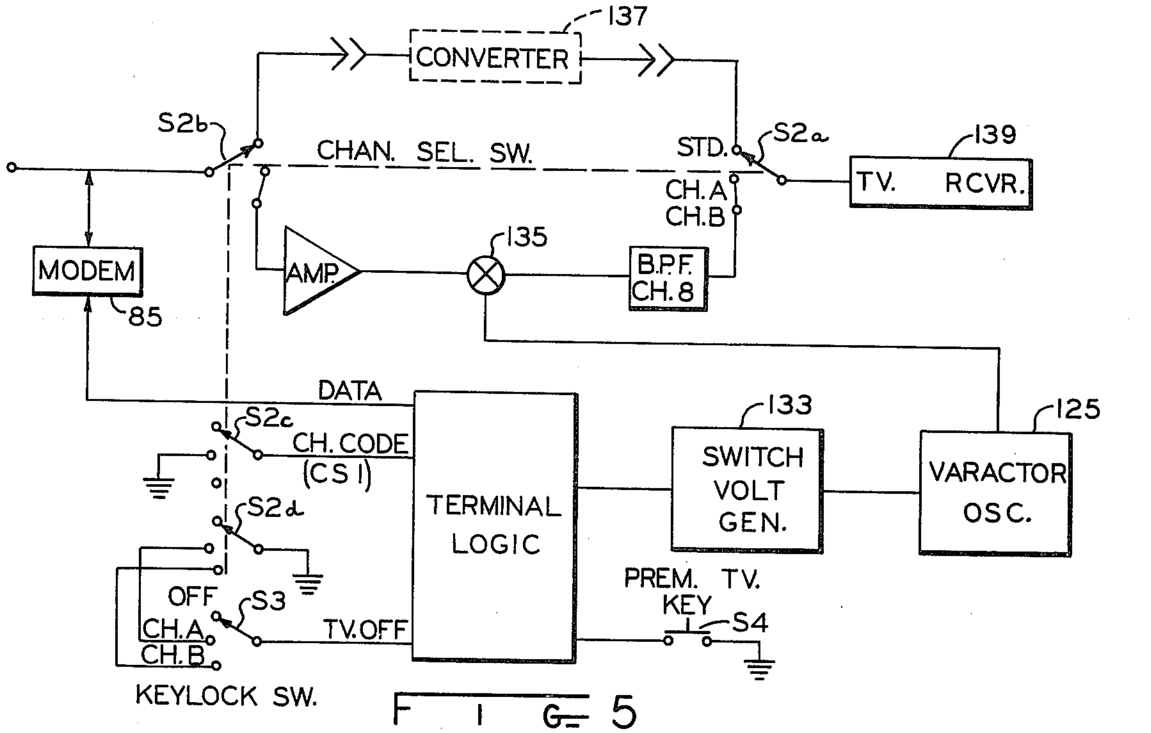
FIG. 5 is a further possible subscriber control unit schematic.

The circuitry of FIG. 5 functions much like that of FIG. 4, but does not employ the local oscillator 131 and second mixer 129. As with the circuit of FIG. 4, no inversion problems occur since the mixer 135 acts on all incoming premium channels rather than merely one out of the two premium channels on which a desired program is presented. A video converter 137 may be employed if desired and, for standard or non-premium programming, the ganged switch S2 is in its upper position and the incoming signal is routed directly through the converter 137 to the television receiver 139. For premium programming, this particular circuit is illustrated as capable of receiving either of two premium programs and to receive those premium programs must first select either channel A or channel B by moving the switch S2 to the appropriate position. If the corresponding key lock switch S3 is in the off position, no signal will be present at the receiver input. When the subscriber turns the key lock switch to the proper on position the premium program will be presented to the receiver. It may be that when the subscriber turns to this premium program channel the program is in its preview period and no scrambling is occurring, thus allowing the subscriber a period of time to decide whether he is interested in this particular program. The subscriber may purchase a premium program at any time during or after the preview period by depressing the premium request key S4 which may, for example, remove a ground from the decommutating switch input 133 of FIG. 4.

Figure 6:
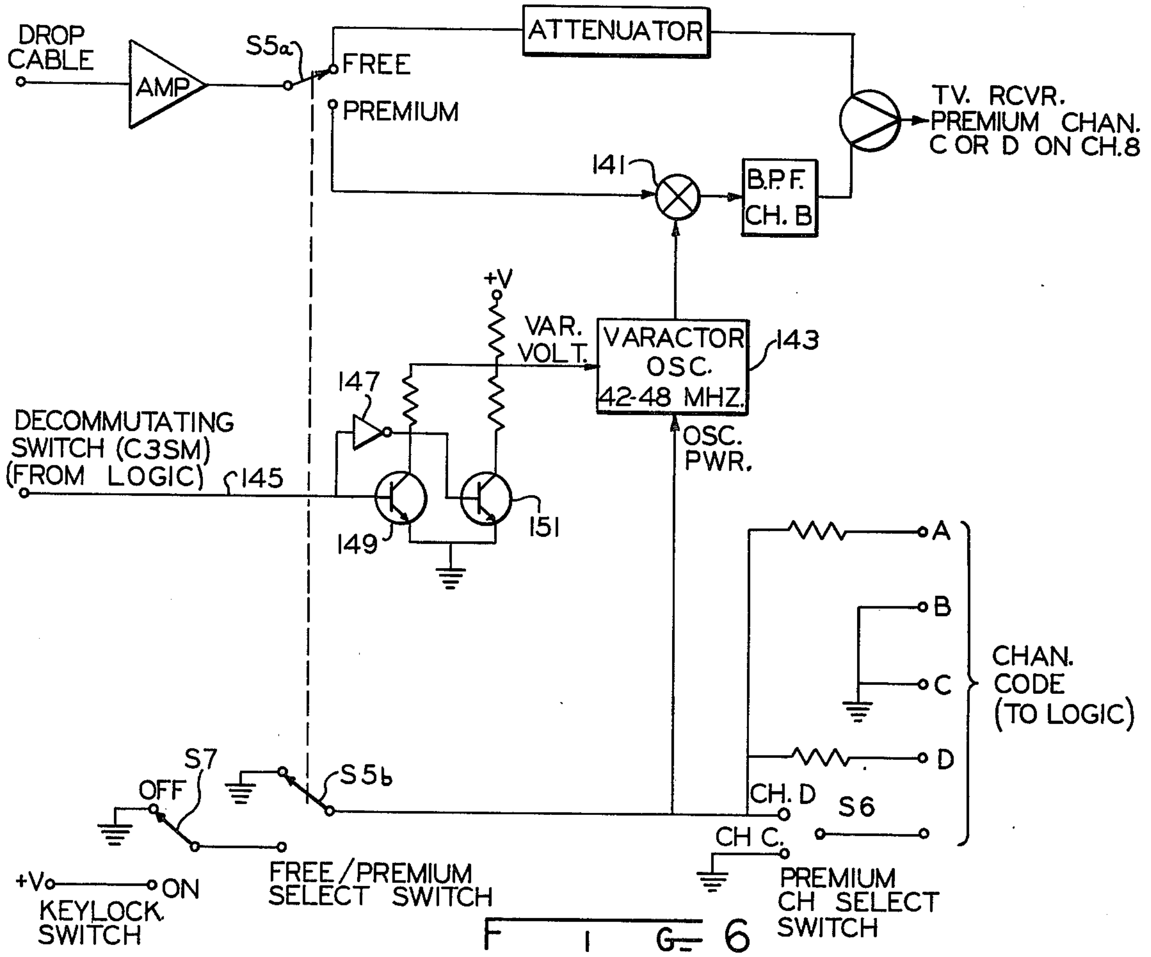
FIG. 6 illustrates another scheme for implementing a subscriber control unit.

While a number of further possible implementations of the subscriber control unit will suggest themselves to those of ordinary skill in the art only one further circuit will be discussed in that it somewhat simplifies the structure illustrated in FIG. 5. In FIG. 6, a simple ganged switch S5 allows the selection of free or premium programming and the circuitry of FIG. 6 is limited to a two premium channel environment as selected by the premium channel select switch S6. Again a mixer 141 combines the scrambled premium signal with a variable frequency signal from a local oscillator 143 the frequency of which is switch in field synchronization with the switching of the channel over which a desired program is being received. A key lock switch S7 analogous to the key lock switch S3 of FIG. 5 may be provided to prevent unauthorized premium viewing. The decommutating input signal is supplied on line 145 to an inverter amplifier 147 and by way of the transistor pair 149 and 151 to provide either of two selected voltages to the voltage variable oscillator 143 in accordance with the particular bit present on line 145. In other words, the amplifier 147 and transistor pair 149 and 151 like the analogous structure in FIGS. 4 and 5 functions as a digital to analog converter to provide an analog voltage for controlling the variable frequency oscillator. Power to this variable frequency oscillator 143 is inhibited unless switch S5 as well as the key lock switch are in the appropriate position for premium viewing and these two switches being in the appropriate down position as illustrated for premium viewing in conjunction with the position of switch S6 may be transmitted back to the IDEM for billing purposes.

Thus, while the present invention has been illustrated in several possible forms, further modifications will readily suggest themselves to those of ordinary skill in the art and accordingly the scope of the present invention is to be measured only by that of the appended claims.

I claim:

1. A subscriber television system comprising:

a central unit having a source of first and second field synchronized television program signals;

at least one local exchange unit for bilateral communication with a plurality of subscriber units and unilateral communication with the central unit;

each subscriber unit including a television receiving device and a subscriber control unit coupled thereto;

a plurality of video channels for conveying television program signals from said central unit to each subscriber unit;

said central unit including means for selectively connecting at least one television program source to a first preselected channel for a first time period and to a second channel for a second time period, said central unit further including means for signalling a status of said connecting means to each of said local exchange units, and;

means included within each subscriber control unit to supply said at least one television program signal to the corresponding television receiving device from said first preselected channel for said first time period and from said second channel for said second time period, said supply means controlled by signals from said associated local exchange unit.

2. The system of claim 1 wherein the product of the television program signal field rate and the first time period as well as the product of the television program signal field rate and the second time period are integers.

3. The system of claim 1 wherein both television program signals begin field scan substantially contemporaneously, said means for selectively connecting being operable only during vertical retrace periods.

4. The system of claim 1 further comprising means for connecting the second television program signal source to said first preselected channel for said second time period and to said second preselected channel for said first time period, and means for synchronizing the last mentioned means and the means for selectively connecting to insure that no two television program sources are ever connected to the same channel at the same time.

5. The system of claim 1 wherein the said channels are frequency band channels and wherein the means included within each subscriber control unit includes mixer means and local oscillator means selectively operable when enabled to convert a signal received on one of said channels to a different channel.

6. The system of claim 5 further comprising filter means tuned to pass signals on said different channel, said filter means coupling the output of the mixer to the input of the television receiving device.

7. The system of claim 1 wherein the video channels comprise a pair of feeder lines, the means included within each subscriber control unit including switch means for alternately coupling the feeder lines to the input of the television receiving device.

8. A subscriber television system comprising:

a central unit having a source of a first television program signal and a source of a second television program signal in field synchronization with said first television program signal;

at least one intermediate processor for bilateral communication with a plurality of subscriber units and unilateral communication with the central unit;

each subscriber unit including a television receiving device and a subscriber control unit coupled thereto;

at least two video channels for conveying television program signals from said central unit to each subscriber unit;

said central unit including a first switching matrix for coupling said first television program source to another of said video channels and selectively operable to repetitively simultaneously interchange the video channels to which said first and second television program sources are coupled to thereby provide on each of said two video channels a sequence of interleaved portions of signals from each television program source, said central unit including means for signalling activity of said first switching matrix to said intermediate processors; and each subscriber control unit including a second switching matrix operable in response to signals from said associated intermediate processor, said second switching matrix operating in unison with said first switching matrix for selectively coupling the television receiving device to the one of the two video channels currently conveying a desired television program signal.

9. The system of claim 8 wherein the first and second switching matrices are operable only during the time intervals between successive television program signal fields.

10. The system of claim 9 further comprising means for generating and transmitting to each subscriber control unit between fields a binary digit indicating which channel will carry the first television program signal on the next succeeding field.

11. The system of claim 9 further comprising register means for storing digital information identifying the sequence of switching of said second switching matrix.

12. The system of claim 11 wherein the register means comprises an n-bit register each digital position of which identifies the channel on which an associated field of the first television program is being carried, the same bit being associated with every nth field of the signal.

13. The system of claim 11 wherein each intermediate processor forwards to individual subscriber units from said central unit the sequence identifying digital information and receiving from the subscriber units and recording subscriber viewing information.

14. The system of claim 13 wherein the subscriber viewing information is recorded after the elapse of a preview period for each premium program, said first switching matrix maintaining a fixed signal-channel distribution until after the expiration of the preview period.

15. In a subscriber television system the improved method of scrambling and unscrambling a television program signal wherein said subscriber television system includes a central unit having a source of a first television program signal and a second television program signal in field synchronization with the first television program signal and at least one intermediate processor for bilateral communication with a plurality of subscriber units and unilateral communication with the central unit, said subscriber television system further including at least one control unit remote from the central unit associated with and coupled to each preselected intermediate processor, comprising the steps of:

transmitting the television program signal over a first video channel for a first time period and over a second video channel for a second time period;

generating an n-bit number at the central unit;

transmitting the n-bit binary number to said intermediate processors;

repetitively sequentially examining the bits at the field rate and transmitting the first television program signal on the first video channel and the second television program signal on the second video channel if the most recently examined bit is a "one" and transmitting the first television program signal on the second video channel and the second television program signal on the first video channel if the most recently examined bit is a "zero;"

examining the transmitted n-bit binary number at the said intermediate processors in synchronism with the examination thereof at the central unit; and selectively connecting a television receiving device to the first video channel for the first time period if the most recently examined bit is a "one" and to the second video channel for the second time period if the most recently examined bit is a "zero," the first and second time periods being integral multiplex of the time of duration of one field of the television program signal.

16. In a subscriber television system having a central processor and a plurality of intermediate processors for bilateral communication with a plurality of subscriber units and unilateral communication with the central processor, a subscriber control unit coupling an individual subscriber televison receiving device to an intermediate processor comprising:

a variable frequency oscillator;

a mixer having one input coupled to a source of television program signals including field synchronized scrambled television program signals and another input coupled to the variable frequency oscillator;

filter means coupling the mixer output to the television receiving device for supplying a single predetermined channel thereto;

means for selectively varying the frequency of the variable frequency oscillator immediately prior to each field of the received scrambled television signals in accordance with an unscrambling code supplied to said intermediate processors from said central processors; and a subscriber operable free-premium switch effective in the "free" position to bypass the mixer and to supply television program signals to the television receiving device and effective in the "premium" position to supply television program signals to the mixer, and key lock switch means having a removable key for preventing unauthorized use of the subscriber control unit when the free-premium switch is in the "premium" position.

17. The improvement of claim 16 wherein the free-premium switch is a double-pole single-throw switch with one pole thereof in series with the key lock switch means and coupling the variable frequency oscillator to an energy source therefore to thereby prevent operation of the variable frequency oscillator unless the key lock means is in the "on" position and the free-premium switch in the "premium" position.

18. The improvement of claim 6 wherein the variable frequency oscillator is voltage controlled, the control voltage determined by a plurality of binary input signals, and wherein the means for selectively varying comprises the key lock switch, the key lock switch grounding a one of said binary input signals when the switch is not in the "premium" position.

* * * * *